United States Patent [19]

Gallant

[11] Patent Number: 5,538,581
[45] Date of Patent: Jul. 23, 1996

[54] METHOD FOR ELECTROMAGNETICALLY WELDING THERMOPLASTIC ARTICLES TOGETHER

[75] Inventor: Christopher M. Gallant, Greenland, N.H.

[73] Assignee: Davidson Textron Inc., Dover, N.H.

[21] Appl. No.: 382,441

[22] Filed: Feb. 2, 1995

[51] Int. Cl.$^6$ ............................................. B32B 31/28
[52] U.S. Cl. .......................... 156/272.4; 156/273.3; 156/273.5; 156/272.2; 219/634
[58] Field of Search .................... 156/272.4, 272.2, 156/272.4, 273.3, 273.5, 274.4; 219/634, 603, 600

[56] References Cited

U.S. PATENT DOCUMENTS

| | | | |
|---|---|---|---|
| 3,126,544 | 4/1964 | Allingham | 29/420 |
| 3,132,204 | 5/1964 | Giellerup | 174/117 |
| 3,574,031 | 4/1971 | Heller, Jr. et al. | 156/273 |
| 3,941,641 | 3/1976 | Heller, Jr. et al. | 156/272 |
| 4,029,837 | 6/1977 | Leatherman | 156/272.4 X |
| 4,806,204 | 2/1989 | Manfre et al. | 162/106 |
| 5,073,318 | 12/1991 | Rohrlach et al. | 264/46.5 |
| 5,286,326 | 2/1994 | Greve | 156/272.4 |
| 5,340,428 | 8/1994 | Kodokian | 156/272.2 |

FOREIGN PATENT DOCUMENTS

| | | | |
|---|---|---|---|
| 61-82351 | 4/1986 | Japan | 156/272.4 |
| 61-233074 | 10/1986 | Japan | 156/272.2 |
| 62-263025 | 11/1987 | Japan | 156/272.4 |
| 63-242627 | 10/1988 | Japan | 156/272.4 |

Primary Examiner—David A. Simmons
Assistant Examiner—Steven J. Helmer

[57] ABSTRACT

An automotive door trim panel includes a carpet face panel that is electromagnetically welded to the lower portion of a thermoplastic substrate. The thermoplastic substrate is prepared by depositing metal particles on a bond surface of the thermoplastic substrate. Direct current is applied to the coil of an electromagnet disposed beneath the substrate to hold the metal particles on the bond surface. A molded-to-shape carpet face panel is then pressed against the mold surface while alternating current is applied to the coil of the electromagnet to electromagnetically weld the carpet face panel to the thermoplastic substrate.

8 Claims, 1 Drawing Sheet

METHOD FOR ELECTROMAGNETICALLY WELDING THERMOPLASTIC ARTICLES TOGETHER

BACKGROUND OF THE INVENTION

This invention relates generally to composite thermoplastic articles and more particularly to a method of electromagnetically welding thermoplastic articles together.

Modern automotive door trim panels comprise a structural thermoplastic substrate that is covered by a soft decorative cover or cloth, leather or thermoplastic material for aesthetic purposes. Such door trim panels, particularly those for upscale models, often include a carpet face panel on the lower portion of the door trim panel where the door trim panel is particularly susceptible to wear and tear. See for instance U.S. Pat. No. 5,073,318 granted to Milo L. Rohriach and William J. Hall on Dec. 17, 1991 for a door trim panel that includes a carpet face panel that is attached to the lower portion of a facing layer of a trim panel by an adhesive.

It is also known that a carpet face panel can be electromagnetically welded directly to a thermoplastic substrate of a door trim panel. In this known method magnetic particles of metal, iron, or other magnetic material that can be heated dielectrically or by induction are mixed into an adhesive that is applied to the bond surface of the thermoplastic substrate. A carpet face panel, which has been molded to shape is then pressed against the adhesively coated bond surface of the thermoplastic substrate. A high frequency current in the radio frequency range is then applied to an electromagnet beneath the bond surface of the substrate. This heats the magnetic particles which in turn heat and melt the abutting plastic surfaces of the carpet face panel and the to weld these surfaces together. See also U.S. Pat. No. 3,574,031 granted to W. C. Heller, Jr. and A. F. Leatherman Apr. 6, 1971 for a method of heat welding thermoplastic bodies using a stratum of susceptor material and U.S. Pat. No. 3,941,641 granted to William C. Heller, Jr. and Alfred F. Leatherman Mar. 2, 1976 for a bonding method and apparatus.

SUMMARY OF THE INVENTION

The object of this invention is to provide a method for electromagnetically welding thermoplastic articles together that is more economical than the known methods described above. This economy is generally achieved by eliminating the need for an adhesive or other carrier for the electromagnetic particles that absorb the electromagnetic energy to produce heat for welding the thermoplastic articles together.

A feature of the invention is that the particles per se are deposited onto the bond surface and held on the bond surface without any need for an adhesive or other carrier for the particles.

Another feature of the invention is that the particles per se are deposited onto the bond surface and held on the bond surface magnetically thereby eliminating any need for an adhesive or other carrier for the particles.

Still yet another feature of the invention is that the particles per se are deposited directly onto a bond surface and held on the bond surface by the same electromagnet that is used heat the particles thereby eliminating any need for expensive auxiliary processing equipment.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
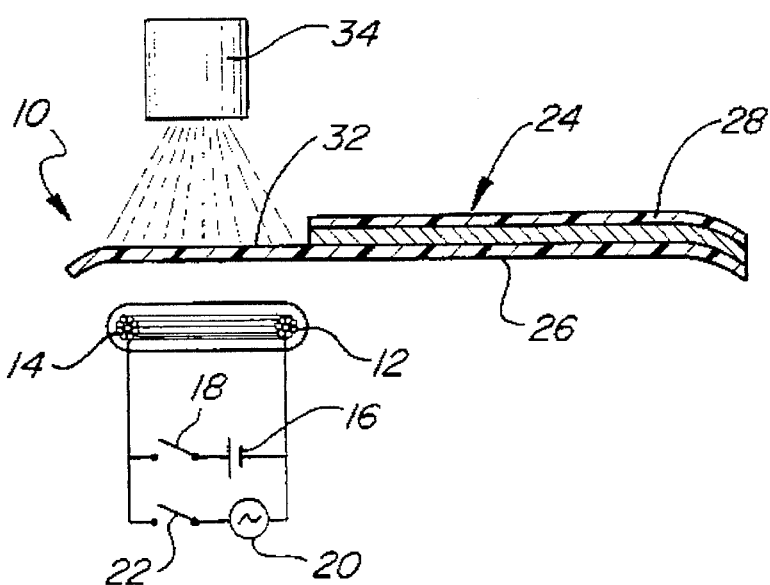
FIG. 1 is a schematic view of an incomplete automotive door trim panel and apparatus for electromagnetically welding thermoplastic parts of the trim panel together in accordance with the invention.
Figure 2:
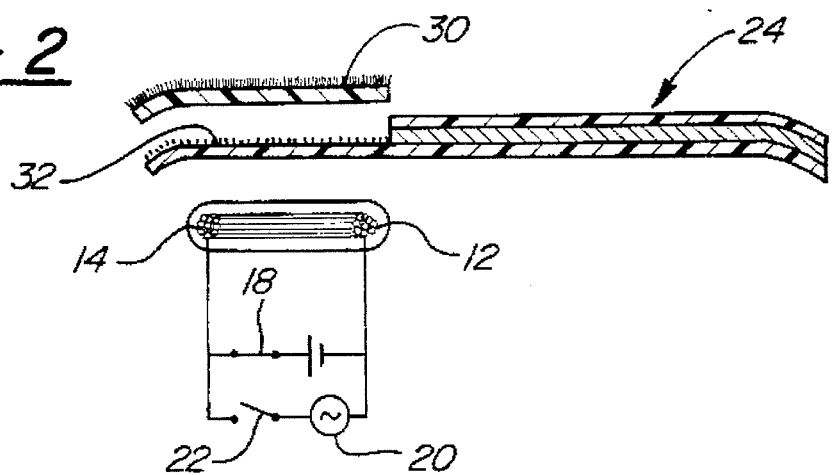
FIG. 2 is schematic view similar to FIG. 1 showing the automotive door trim panel in the process of completion in accordance with the invention.
Figure 3:
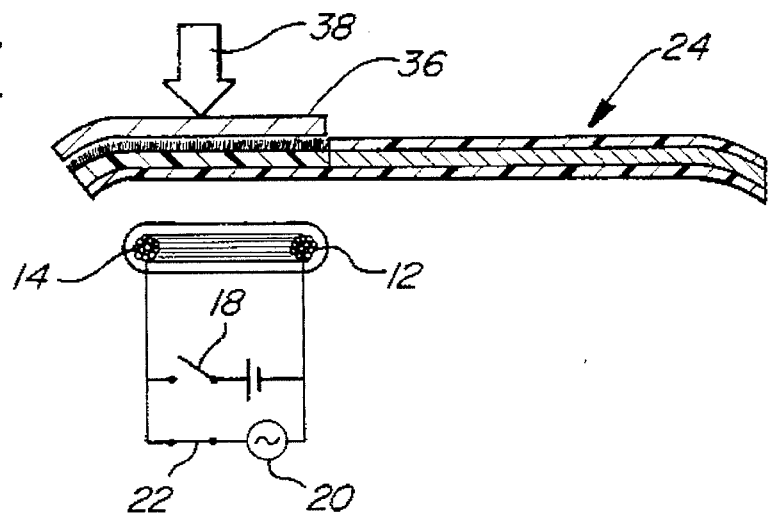
FIG. 3 is another schematic view similar to FIG. 1 showing the automotive door trim panel further along in the process of completion.

Referring now to the drawing, apparatus for electromagnetically welding thermoplastic articles together in accordance with the invention is schematically illustrated in FIGS. 1, 2 and 3 and generally indicated at 10. The apparatus 10 comprises an electromagnet 12 having a coil 14 that may be electrically connected to two different electrical power sources. The coil 14 may be electrically connected to a direct current power source 16 through an electric circuit that includes a switch 18. The coil 14 may also be electrically connected to an alternating current power source 20 through a parallel electric circuit that includes a switch 22.

The figures also show an automotive trim panel 24 comprising a thermoplastic substrate 26 that typically is molded of a thermoplastic material such as polypropylene (PP), and a soft decorative cover 28 that is adhered to the substrate. The soft decorative cover 28 is typically made of a polyvinyl chloride (PVC) or expanded polyvinyl chloride comprising a polyvinyl chloride skin having a thin backing layer of resilient polyvinyl chloride foam. Polyurethane or expanded polyurethane covers are also used with increasing regularity. Cloth and leather covers may also be used, particularly in upscale models.

The automotive trim panel 24 further includes a carpet face panel 30 that is adhered to the lower portion of the door trim panel. The carpet face panel 30 typically comprises a tufted carpeting material that is embedded in a suitable thermoplastic backing layer such as polyethylene or polypropylene. In this instance the carpet face panel 30 is bonded directly to a bond surface 32 of the thermoplastic substrate 26 in accordance with the method of the invention. Consequently carpet face panel 30 having a thermoplastic backing layer that is compatible with the thermoplastic material of the substrate 26 from an electromagnetic welding standpoint should be selected.

In the method of the invention, magnetic particles stored in bin 34 are delivered to the bond surface 32 of the substrate 26 and deposited thereon as indicated by the dashed lines in FIG. 1. The magnetic particles may be delivered in any suitable manner, such as by pouring, spilling, or blowing.

Switch 18 is closed during the delivery process so that the coil 14 of the electromagnet 12 beneath the bond surface 32 is energized by the direct current power source 16. This direct current energization produces an electromagnetic field that holds the magnetic particles on the bond surface 32 magnetically and tends to distribute the magnetic particles as shown in FIG. 2. Any excess particles may be and preferably are vacuumed off while the coil 14 is energized by the direct current source 16.

The carpet face panel 30 is preferably first molded to shape, for instance by a conventional pressure molding process or a conventional thermoforming process which is commonly referred to as vacuum forming. The shaped carpet face panel 30 is then trimmed and aligned with the bond surface 32 as shown in FIG. 2. The shaped and trimmed carpet face panel 30 is then pressed against the bond surface 32 by platen tool 36.

The carpet face panel 30 is held against the bond surface 32 under pressure as indicated by arrow 38 as switch 16 is opened and switch 22 is closed so that the high frequency alternating current power source 20 is applied to the coil 14. This high frequency alternating current energization of the coil 14 heats the magnetic particles sandwiched between the carpet panel backing and the bond surface 32. The heated particles melt the engaging surfaces of the carpet face panel 30 and the thermoplastic substrate 26 so that the two plastic panels are welded together under the pressure of the platen tool 36. When the electromagnetic weld is completed, the switch 22 is opened and the platen tool 36 is raised or otherwise removed from the completed door trim panel 24 shown in FIG. 3.

The method of the invention is particularly advantageous for attaching a carpet face panel because heat is not applied to the face of the carpet. This avoids any possibility of damaging the carpet pile. However, the method of the invention may be used to attach any thermoplastic panel or article to another thermoplastic panel or article.

In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A method of electromagnetically welding thermoplastic articles together comprising the steps of:
   depositing magnetic particles on a mold surface of a first thermoplastic article while direct current is applied to the coil of an electromagnet disposed beneath the first thermoplastic article to hold the particles on the mold surface,
   pressing a second thermoplastic article against the mold surface while the magnetic particles are held on the mold surface, and
   applying an alternating current to the coil of the electromagnet while the second thermoplastic article is pressed against the mold surface to electromagnetically weld the thermoplastic articles together.

2. The method of electromagnetically welding articles together as defined in claim 1 wherein the direct current is electrically disconnected from the coil of the electromagnet when the alternating current is applied to the coil.

3. The method of electromagnetically welding articles together as defined in claim 2 wherein the alternating current that is applied to the coil is a high frequency alternating current.

4. The method of electromagnetically welding articles together as defined in claim 3 wherein the alternating current that is applied to the coil is in the radio frequency range.

5. A method of electromagnetically welding thermoplastic panels together comprising the steps of:
   disposing a thermoplastic substrate panel over an electromagnet and depositing magnetic particles on a shaped upper mold surface of the thermoplastic substrate panel while direct current is applied to a coil of the electromagnet to hold the deposited magnetic particles on the mold surface of the substrate panel,
   pressing a shaped thermoplastic cover panel against the shaped upper mold surface of the substrate so that the deposited magnetic particles are sandwiched between the shaped upper mold surface of the substrate and a back surface of the shaped thermoplastic cover panel, and
   holding the shaped thermoplastic cover panel against the shaped upper mold surface of the substrate panel while an alternating current is applied to the coil of the electromagnet to weld the shaped thermoplastic cover panel to the thermoplastic substrate panel.

6. The method of electromagnetically welding panels together as defined in claim 5 wherein the direct current is electrically disconnected from the coil of the electromagnet when the alternating current is applied to the coil.

7. The method of electromagnetically welding panels together as defined in claim 6 wherein the alternating current that is applied to the coil is a high frequency alternating current.

8. The method of electromagnetically welding articles together as defined in claim 7 wherein the alternating current that is applied to the coil is in the radio frequency range.

* * * * *